Patented Nov. 10, 1953

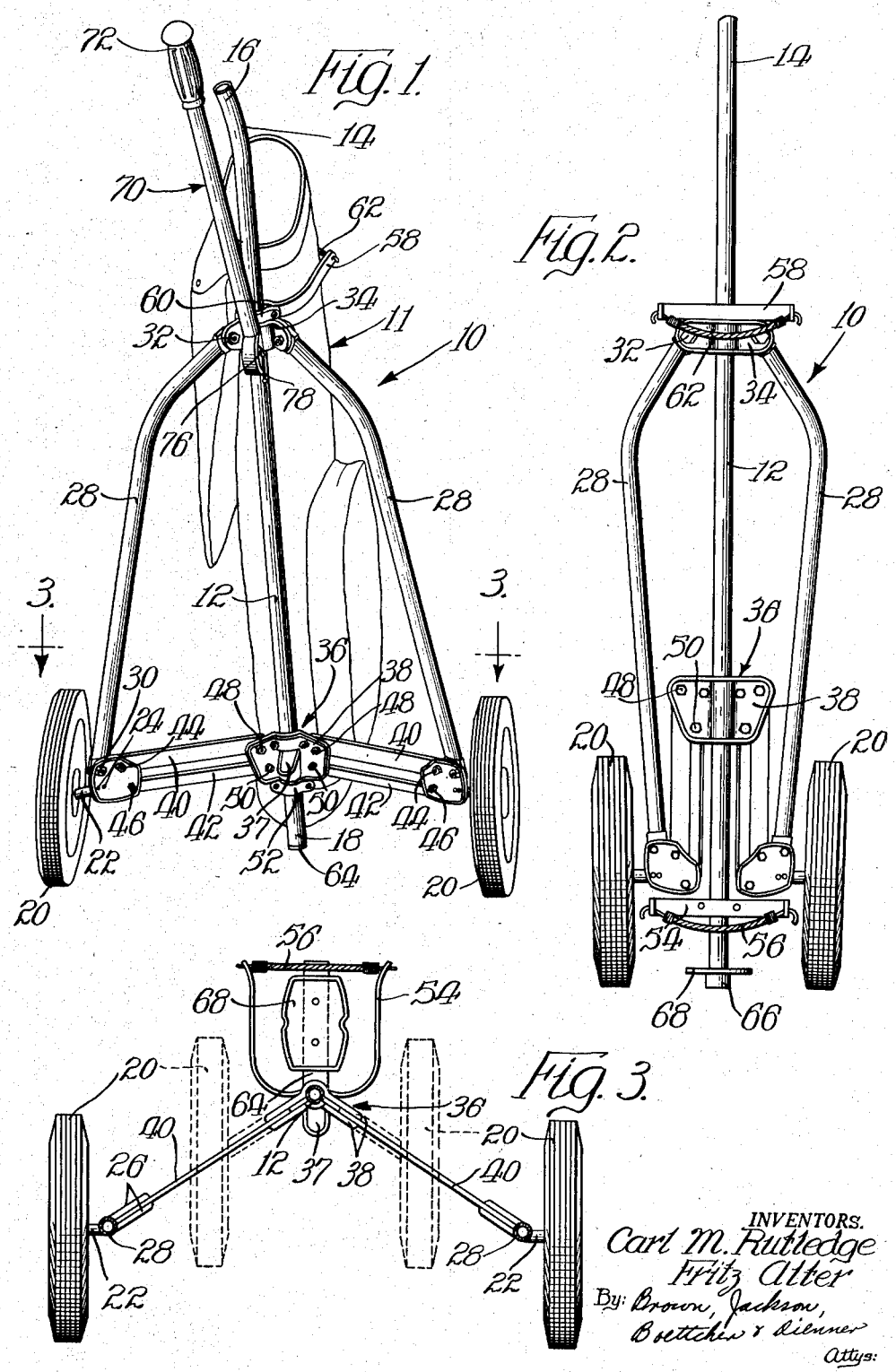

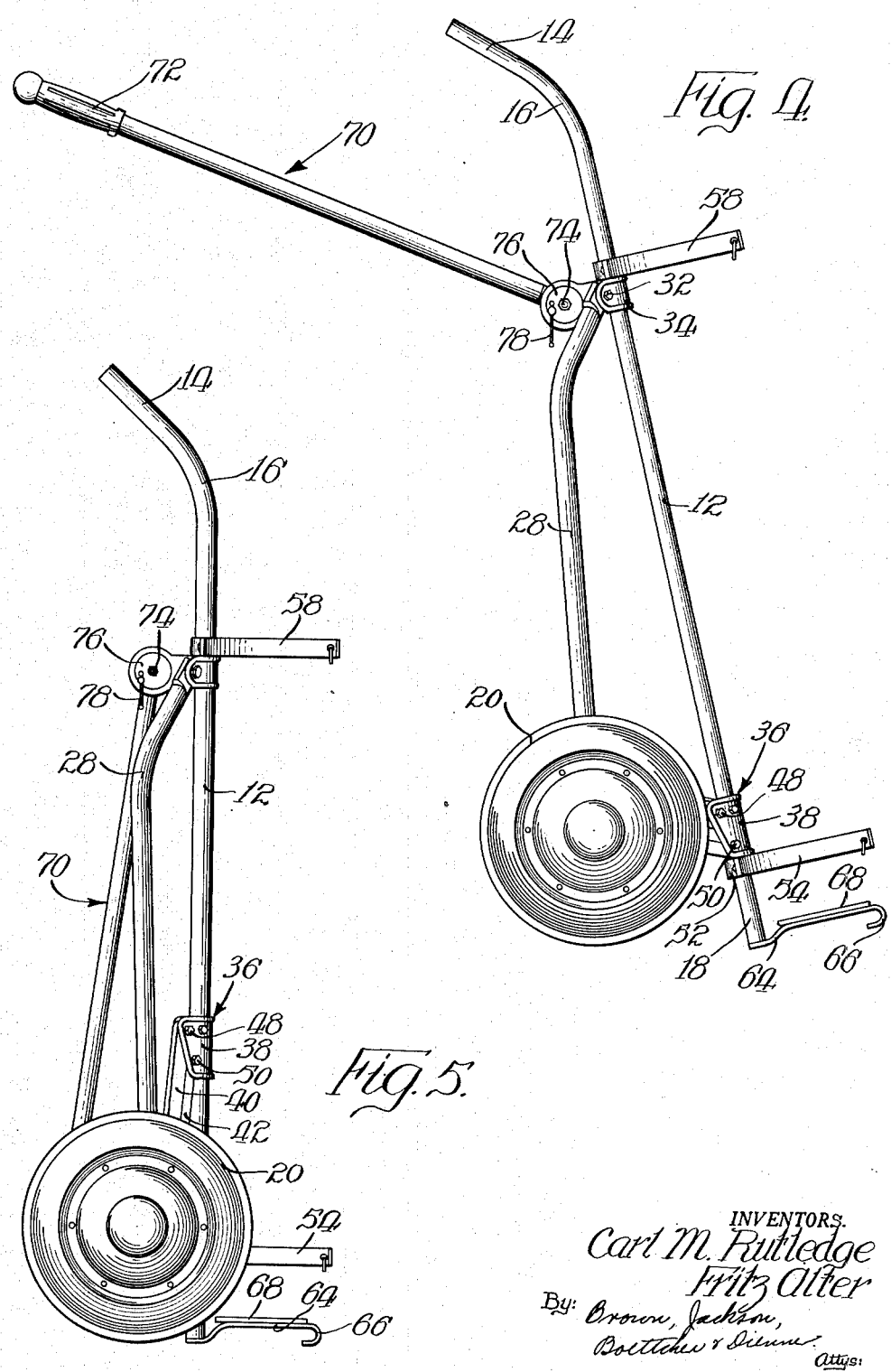

2,658,771

UNITED STATES PATENT OFFICE 2,658,771

FOLDABLE GOLF BAG CARRIER

Carl Maynard Rutledge, Ringwood, and Fritz Alter, Pistauqua Heights, Ill., assignors to American Steel Box Corporation, Chicago, Ill., a corporation of Illinois Application January 19, 1949, Serial No. 71,654

11 Claims. (Cl. 280—42)

Our invention pertains generally to a wheeled support which is adapted to carry a golf bag and be drawn by hand. Such devices are frequently referred to as "golf carts" and this invention has particular reference to a "collapsible" golf cart.

Golf carts of various construction are presently on the market and in use, and many of them are made in a so-called "collapsible" form so that they may be more conveniently and readily stored or transported from place to place in an automobile or the like. To our knowledge, existing golf carts which are collapsible have the disadvantage of not being serviceable for wheeling golf bags about when the carts are in collapsed condition. This results in considerable inconvenience wherever narrow passageways must be negotiated since, in the golf carts presently known, collapse of the cart means that the user must carry not only the golf bag but also the cart through the passageway to a location where the cart may be expanded again for normal use.

It is the primary object of our invention to provide a cart for supporting a golf bag and golf clubs and for permitting the same to be wheeled about when the cart is in either its normal position or in its collapsed position. This makes simple the use of the cart in locker rooms where passageways are narrow and also in locations on golf courses or elsewhere, where the tread of the cart in normal traveling position is such that the passageway cannot be negotiated. The cart is also adapted to support the golf bag in upright position when the cart is at rest in either normal or collapsed position. In accomplishing this object, we have adopted structure which maintains the ground engaging wheels substantially parallel to each other and substantially vertically disposed with respect to the ground when the cart is in either its normal position or collapsed position. The structure employed is, for the most part, tubular, whereby additional strength and greater lightness is obtained.

In the preferred form of the invention, the central body member comprises a tubular member with which there are associated supporting means which support the golf bag vertically and against lateral displacement regardless of the angle to which the cart is tipped. It is another object of our invention to employ such supporting means as a stop or abutment for certain of the moving parts which provide the collapsible features of the cart.

It is yet another object of the invention to have the central body member afford an integral hand grip which is useful for directing the cart, as by pushing or pulling it, in either normal position or collapsed position, particularly, the latter. The handle also serves as a convenient means for lifting the golf cart and the supported golf bag and clubs into or out of a locker, automobile, etc.

It is yet another object of the invention to provide, in addition to the hand grip, a pivoted handle connected to the cart, which handle extends forwardly beyond the hand grip and is useful in drawing the cart on the course and which is also adapted to provide a support for the cart in inclined position, the end of the handle, together with the two wheels forming a three point support, whereby the golf bag is inclined at a convenient angle when not in movement so that golf clubs may be readily withdrawn from it.

It is still another object of our invention to provide means engageable by a foot of the user for putting the cart in either collapsed position or normal position without requiring the user to bend over or to use his hands on the movable portions of the structure.

It is another object of the invention to provide a golf cart having an independent axle for each of a pair of wheels with the wheels being disposed generally forwardly of the central body portion so that, when the cart is tilted forwardly for drawing it, a golf bag supported on the central body portion is disposed above the ground with adequate clearance.

Other objects, uses and advantages of the invention will become apparent, or be obvious, from a consideration of the following description and from the drawings, in which:

Figure 1 is a perspective view of the cart in expanded condition (normal position) with the cart being in a position of rest and illustrating the location of a golf bag;

Figure 2 is a rear elevational view of the cart in collapsed position and in a position of rest;

Figure 3 is a sectional view substantially on the line 3—3 of Figure 1, with the wheels in solid line showing the expanded position and the wheels in dotted outline showing the contracted or collapsed position;

Figure 4 is a side elevational view of the cart in normal position and in a position of rest, that is, a side elevation of the cart of Figure 1; and Figure 5 is a side elevational view of the cart as shown in Figure 2.

Like reference numerals have been employed in the several views to indicate the same or similar elements.

Referring now to Figures 1, 3 and 4 of the drawings, there will be seen a cart, indicated generally by the reference numeral 10, which is adapted for transporting a golf bag 11 from place to place. The cart 10 comprises a central body portion or member 12 which, in its preferred form, comprises a tubular member having a forwardly turned upper end 14 to provide a hand grip 16 and a lower end 18 which is adapted to contact the ground for a purpose to be referred to hereinafter. A pair of ground engaging wheels 20 are disposed on either side of the body member 12 and at equal distances therefrom. Each wheel 20 has its own axle 22 and the body member 12 lies generally rearwardly of a common line joining the axles so that the contact points of the wheels 20 and the lower end 18 of the body member 12 can provide a three point support for the cart and the golf bag when the cart is in upright position of rest, either in normal position or collapsed position.

Each axle 22 is bent at its free end and is secured by pins or bolts 24 between a pair of axle supporting plates 26, as may be seen from Figures 1 and 3. Brace structures in the form of arms 28, one on either side of the central body member 12, are pivotally connected at their one ends, as at 30, between the plates 26 and are pivotally connected with respect to the central body member at their upper ends, as at 32, to a block comprising a pair of brackets 34, which are bent forwardly and between the extending end portions of which the arms 28 are connected. The block or brackets 34 are disposed on opposite sides of the central body member 12 and are clamped together thereon so that the brackets are not shiftable relative to the said body member.

A movable connecting member in the form of a slidable block, indicated generally by the reference numeral 36 and formed of a pair of brackets 38 which are bent forwardly with respect to the central body member 12, is slidable upwardly and downwardly along said central body member. A brace structure in the form of a pair of parallel arms is disposed on each side of the body member 12 and each pair includes an upper heavier arm 40 and a lower smaller arm 42, both of which arms are pivotally connected at their one ends between the plates 26, as at 44 and 46 respectively. The arms 40 and 42 of each brace structure are pivotally connected at their other ends between the plates 38 of the block 36, as at 48 and 50, respectively. By employing the interconnected pairs of parallel arms 40 and 42, the wheels 20 are maintained in substantial parallelism in both expanded and collapsed positions.

Secured to the central body member 12, near its lower end 18, by clamp means 52, is a generally U-shaped member 54 which serves to embrace a golf bag and, together with a removable elastic member 56 extending between the free ends of the U-shaped member 54, to prevent lateral displacement with respect to the central body member 12. A similar U-shaped member 58 is secured, as by clamping means 60, to the central body member 12 near its upper end. Resilient member 62 is also adapted to be connected across the ends of the arms of the U-shaped member 58. Although a resilient member such as the members 56 and 62 is found to be very satisfactory in conjunction with the U-shaped brackets 54 and 58, respectively, other yieldable means adapted to permit the entry and removal of a golf bag from the U-shaped members may be employed.

There is secured to the lower end 18 of the central body member 12, as by welding, a metal strap or flange 64 which extends rearwardly with respect to the central body member 12 of the cart 10 and then upwardly and is curled down and forwardly at its free end as shown at 66 in Figures 4 and 5. A platform 68 is secured to the top surface of the strap 64 and on such platform the lower end of the golf bag 11 is adapted to rest. It will readily be seen that the platform 68 and the U-shaped members 54 and 58, together with the elastic members 56 and 62, are adapted to restrain the golf bag against a vertical or lateral displacement from the golf cart 10.

Referring now to Figures 1, 4 and 5, it will be seen that in addition to the hand grip 16, which preferably is formed integrally with the central body portion 12, there is additionally provided a handle 70 having its own hand grip 72 at its free end and being pivotally connected as at 74 between a pair of circular flanges 76 which are connected with the forward bracket 34 by the same nuts and bolts which serve to pivotally connect the braces 28 to the brackets 34, as at 32. By means of a retaining device (not shown) operable by the small handle 78, the handle may be maintained at various angles with respect to the central body portion 12. It will be observed that the handle 70 extends considerably further forward than does the hand grip 14 so that when the cart is being employed on a golf course and is being drawn along forwardly by the handle 72, the user will be sufficiently forward of the cart that it will not ride up on his heels. The length of the handle 70 is also sufficiently great that it may be directed downwardly and form one contact of a three point contact to permit the cart to be rested in a position inclined forwardly from upright position—at a 45° angle, for example—in order to permit easy withdrawal of clubs from the golf bag.

It will also be observed at this point from Figures 4 and 5 that the two wheels 20, together with the lower end 18 of the central body member 12— or the bottom of the strap 64—will also form a three point contact to support the cart and the golf bag in upright positions of rest in both the normal position of the cart, wherein the wheels 20 are spread apart, or in the collapsed position of the cart, wherein the wheels are brought in closely adjacent the central body member 12. The cart will maintain its upright positions as shown in Figures 4 and 5 both with or without the golf bag in place. As will be apparent, particularly from Figure 3, the wheels 20 are maintained in substantially parallel arrangement with respect to each other and in planes perpendicular to the ground regardless of whether the wheels are in their fully spread apart position— that is, normal position—or in their collapsed position, as shown in the dotted line position of Figure 3, or at any intermediate point. Consequently, the cart may be wheeled through narrow passageways in upright position when it is in its collapsed position, a fact which makes it very useful in locker rooms where the aisles are narrow, since the user will frequently wish to wheel the golf cart and golf bag and clubs directly from the golf course or automobile to his locker. In its collapsed position the cart may easily be stored in a locker.

Assuming for purposes of illustration, that the user has placed the golf cart in its collapsed traveling position with the handle 70 folded downwardly (as shown in Figure 5) in his automobile for transportation to a golf course, it will be seen that the block 36 is at an elevated position relative to a plane which includes the axles 22 and lies perpendicular to the body member 12.

The pairs of parallel arms 40 and 42 are in side by side position and extend generally vertically and the braces 28 are drawn in toward the central body member 12. Consequently, the wheels 20 are positioned adjacent the central body member but with their axles 22 being positioned generally forwardly of the central body member 12. The pivot points 32, 44, 46, 48 and 50, on one side of the central body member 12 lie in substantially a single plane and the corresponding pivot points on the other side of the body member lie in another plane, with the two planes being disposed generally rearwardly of a common line joining the axles of the wheels. Because of this construction, it will be readily apparent that when the cart is tilted forwardly for drawing it or for pushing it, the central body member 12 will pivot about the axles 22 and the lower end 18 will move counter-clockwise and upwardly away from the ground so that there is adequate clearance for the body member 12 and the golf bag 11 from the ground over which the cart will be drawn or pushed. As will be apparent from Figure 3, the structure employed for pivotally connecting the wheels 20 with the central body member 12 provides an arched arrangement with the golf bag 11 at the peak of the arch as the cart is drawn along.

When the golf cart is being transported from place to place while in its collapsed position, or is being stored in said position, the golf bag may be retained on it, if desired. Then when the user arrives at the location at which he proposes to use the cart and the golf bag, the two may be unloaded together from his automobile and may immediately be wheeled wherever he desires, since the wheels 20 are in ground engaging position in the collapsed position of the cart, as well as in its expanded, or normal, position. However, if the user immediately desires to place the cart in normal position wherein the wheels 20 are spread apart a substantial distance to provide greater stability against lateral tipping, he will then step upon the pedal 37 which is connected to the block 36 and thereby push the block 36 downwardly along the central body member 12 while holding on to the central body member by the hand grip 16. Pushing on the block 36 will cause it to slide downwardly away from the block 34 toward the lower end 18 of the central body member and will cause the pairs of parallel arms 40 and 42 and the braces 28 to extend a greater distance forwardly and outwardly from the central body member, until the block 36 engages the U-shaped member 54 and its clamp 52, which serve as a stop for the block 36. Depending upon the location of the member 54 and clamp 52, the block 36, in its lowermost position, as shown in Figure 4, will assume a position in, or below, a plane which includes the axles 22 and which lies perpendicular to the body member 12, preferably below such plane. With the block in the preferred position as shown, the cart will not be collapsed by a lateral blow, such as occurs when the side of a wheel is struck, and any weight that is carried on the cart, such as the golf bag and clubs, will tend to maintain the wheels 20 in their spread apart, or normal, position.

If the user wishes to draw or push the cart along after placing it in its normal position, he may employ the hand grip portion 16 of the central body member 12 or may use the handle 70 by raising it from a position such as that shown in Figure 5 to a convenient level such as that shown in Figure 4. If he desires, he may clamp the handle at that level by manipulating the small handle 78 of the clamping means (not shown). Some users may prefer to clamp the handle 70 only when it is to be used for supporting the cart in a forwardly tilted position at which time the hand grip end of the handle 70 at its free end constitutes one contact of a three point contact. When it becomes necessary or desirable, the cart may be put in its collapsed position by moving the block 36 upwardly toward the block 34 without removal of the golf bag from the cart and the cart may again be expanded without in any way requiring adjustment or removal of said bag.

While we have shown a preferred embodiment of the invention for purposes of illustration, it will be appreciated that various modifications and changes coming within the scope of the invention, as defined by the appended claims, will be suggested to others by reason of our disclosure. Therefore, we do not intend to be limited to the illustrated embodiment, except insofar as the following claims are so limited.

We claim:

1. A cart adapted to transport a golf bag or the like and comprising a generally vertically extending body member on which the golf bag is adapted to be supported, said body member at its upper end being turned forwardly to provide a hand grip, a handle pivotally connected to the body member beneath said hand grip and adapted to extend forwardly beyond said hand grip, a pair of ground engaging wheels one on each side of the body member, an axle for each wheel, and movable means pivotally interconnected between each axle and the body member, said means being adapted to permit the wheels to be moved from normal position to collapsed position adjacent the body member, the wheels in both of said positions being in engagement with the ground and being adapted to be wheeled with the golf bag in upright position.

2. The combination of claim 1 wherein the handle is adjustable in position and of such length that it is adapted, when engaging the ground, to support the cart in a forward inclined position.

3. A cart adapted to transport a golf bag or the like and comprising a body member adapted to provide support for a golf bag, said body member at its upper end being turned forwardly to provide a hand grip, a handle pivotally connected to the body member beneath said hand grip and being adapted to extend forwardly beyond said hand grip and being of such length that it is adapted, when engaging the ground, to support the cart in a forward inclined position, a block carried by and slideable along said body member, a pair of ground engaging wheels one on each side of the body member, an axle for each wheel, a pair of arms pivotally connected at its one set of ends with each axle and at its opposite set of ends being pivotally connected with said block, and a pair of brace members, each brace member being pivotally connected at its one end to an axle and being pivotally connected at its other end to said body member, said pair of wheels being adapted to be moved from normal position wherein they are parallel to each other to collapsed position adjacent the body member by movement of said block along said body member from a position lying in, or below, a plane which is perpendicular to said body member and which includes said axles to a position above said plane, the wheels when in said collapsed position continuing to be parallel to each other and in ground engaging position and being adapted to be wheeled with the golf bag in upright position.

4. In a two wheel cart, a body member normally extending generally vertically; supporting means carried by said body member and adapted to support a golf bag or the like in a generally vertical position; a pair of ground engaging wheels, one on each side of the body member; an axle for each wheel; collapsible means connecting the wheels with the body member and maintaining them in substantially parallel relationship and substantially perpendicular to the ground whereby the loaded cart may be wheeled about in upright position in both the collapsed and expanded positions of the cart; said collapsible means comprising a first pair of brace structures, in the form of a pair of parallel arms on each side of said body member, a second pair of brace structures in the form of an arm on each side of said body member, a block providing a slidable connection upwardly and downwardly with respect to said body member, each pair of parallel arms of the first mentioned pair of brace structures being pivotally connected by one set of ends with respect to the body member and being pivotally connected by the other set of ends with respect to the axle for a ground engaging wheel; and each arm of the second mentioned pair of brace structures being movably connected with respect to the body member at one end and with respect to said pair of parallel arms by its other end, and with at least one arm of the arms on each side of the body member having a pivotal connection with said body member by means of said block and with at least one arm of the arms on each side of the body member having pivotal connection with respect to said body member at a level higher on the body member than both the upper and lower positions of said block, said block being movable upwardly on said body member to move said arms and wheels toward said body member to a collapsed position and being movable downwardly on said body member to move said arms and wheels outwardly of said body member to an expanded position, said arms connected to said body member at said higher level guiding said wheels for movement in an arc the lowest point of which is defined in the collapsed position of the cart.

5. A wheeled cart adapted to transport a golf bag or the like, said cart comprising a body member normally extending generally vertically; supporting means carried by said body member and adapted normally to support a golf bag or the like thereon in a generally vertical position; a block carried by and slideable along said body member; a pair of ground engaging wheels one on each side of the body member; an axle for each wheel; a pair of arms on either side of said body member, each pair of arms being pivotally connected with an axle by their one set of ends and being pivotally connected by their opposite set of ends with said block; a brace member on each side of the body member, each brace member being pivotally connected by one end with an axle and by its other end being pivotally connected with the body member higher on the body member than both the upper and lower positions of said block; said brace members being substantially longer than said arms and guiding the wheels in an arcuate path with respect to the body member from the normally expanded position of the cart, wherein the wheels are substantially parallel to each other and perpendicular to the ground, to a collapsed position of the cart, wherein the wheels are substantially parallel to each other and perpendicular to the ground and lie adjacent the body member; the wheels in said latter position being lower with respect to the lower end of the body member than they are when the wheels are in expanded position of the cart; and stop means carried by the body member adjacent its lower end; said block, when the pair of wheels is in expanded position, lying adjacent said stop and so disposing the arms on either side of the body member that they define an angle of less than 90° with respect to the upwardly extending portion of the body member; said pair of wheels being adapted to be moved, by movement of said block upwardly along said body member, from their expanded position through a slightly further spread apart position prior to being moved to collapsed position adjacent the body member; said cart being wheelable with the golf bag or the like in upright position in both the expanded and collapsed positions of the cart.

6. A wheeled cart adapted to transport a golf bag or the like, said cart comprising a body member normally extending generally vertically, supporting means carried by said body member and adapted normally to support a golf bag or the like thereon in a generally vertical position, a block carried by and slideable along said body member, a pair of ground engaging wheels one on each side of the body member, an axle for each wheel, a pair of arms on either side of said body member, each pair of arms being pivotally connected with an axle by their one set of ends and being pivotally connected by the opposite set of ends with said block, and a brace member on each side of the body member, each brace member being pivotally connected by one end with an axle and by its other end being pivotally connected with the body member higher on the body member than both the upper and lower positions of said block, said brace members being substantially longer than said arms and guiding the wheels in an arcuate path with respect to the body member from the normally expanded position of the cart wherein the wheels are substantially parallel to each other and perpendicular to the ground to a collapsed position of the cart, wherein the wheels are also substantially parallel to each other and perpendicular to the ground and lie adjacent the body member, the wheels in said latter position being lower with respect to the lower end of the body member than they are when the wheels are in expanded position of the cart, said cart being wheelable with the golf bag or the like in upright position in both the expanded and collapsed positions of the cart, said body member at its upward end being turned forwardly to provide a hand grip, and a handle pivotally connected to the body member at a position along the body member lower than said hand grip and adapted to extend forwardly beyond said hand grip to provide a towing handle, the length of said handle being such that, in a downwardly directed position, it may serve as a supporting leg to support the cart in a position forwardly inclined from the vertical.

7. A wheeled cart adapted to transport a golf bag or the like, said cart comprising a single upstanding body member, a load support extending outwardly from the lower end of said body member and adapted normally to support a golf bag or the like thereon in a generally vertical position, a pair of blocks mounted on said body member, a pair of spaced parallel ground engaging wheels one on each side of the body member, an axle for each wheel, a pair of arms on either side of said body member, each pair of arms being pivotally connected with an axle by their one set of ends and being pivotally connected by their opposite set of ends with one of said blocks, and a brace member on each side of said body member, each brace member being pivotally connected by one end with an axle and by its other end being pivotally connected with the other of said blocks, one of said blocks being movable longitudinally of said body member, said arms and said brace members maintaining said wheels in parallel relation regardless of the position of said movable block and guiding the wheels in an arcuate path with respect to the body member upon movement of said movable block, said movable block being movable toward the other of said blocks to move said arms, said brace members and said wheels toward said body member to a collapsed position and being movable away from the other of said blocks to move said arms, said brace members and said wheels away from said body member to an expanded position, whereby the cart is adapted to assume an expanded position wherein the wheels are substantially parallel to each other and perpendicular to the ground and a collapsed position wherein the wheels are also substantially parallel to each other and perpendicular to the ground and lie adjacent the body member, the wheels in said latter position being guided by said arms and said brace members to a position lower with respect to the lower end of the body member than they are in when the cart is in its expanded position, said wheels in either position being disposed for ground engagement whereby said cart is wheelable with the golf bag or the like in both the expanded and collapsed positions of the cart.

8. A wheeled cart adapted to transport a golf bag or the like, said cart comprising an upstanding body member, supporting means carried by said body member and adapted normally to support a golf bag or the like thereon in a generally vertical position, a pair of blocks mounted on said body member in longitudinally spaced relation, a pair of ground engaging wheels one on each side of the body member, an axle for each wheel, a pair of arms on either side of said body member, each pair of arms being pivotally connected with an axle by their one set of ends and being pivotally connected by the opposite set of ends with the lower one of said blocks, and a brace member on each side of the body member, each brace member being pivotally connected at one end with an axle adjacent the respective wheel and at its other end being pivotally connected with the upper one of said blocks, one of said blocks being movable longitudinally of said body member toward and away from the other of said blocks, said movable block being movable toward the other of said blocks to move said arms, said brace members and said wheels toward said body member to a collapsed position and being movable away from the other of said blocks to move said arms, said brace members and said wheels away from said body member to an expanded position, said brace member being longer than said arms, said brace members and said arms guiding the wheels for movement in an arcuate path with respect to the body member upon movement of said movable block, said arms being parallel whereby the same maintain said wheels in parallel relation, whereby said cart is adapted to assume an expanded position wherein the wheels are substantially parallel to each other and perpendicular to the ground and a collapsed position wherein the wheels are also substantially parallel to each other and perpendicular to the ground and lie adjacent the body member, the wheels in said latter position being guided by said arms and said brace members to a position lower with respect to the lower end of the body member than they are in when the cart is in expanded position, said wheels in either position being disposed for ground engagement whereby said cart is wheelable with the golf bag or the like in both the expanded and collapsed positions of the cart.

9. In a two wheel cart: a body member normally extending generally vertically; supporting means carried by said body member and adapted to support a golf bag or the like in a generally vertical position; a pair of ground engaging wheels, one on each side of the body member; an axle for each wheel; collapsible means connecting the wheels with the body member and maintaining them in substantially parallel relationship and substantially perpendicular to the ground, whereby the loaded cart may be wheeled about in upright position in both the collapsed and expanded positions of the cart; said collapsible means comprising a first pair of brace structures, in the form of a pair of parallel arms on each side of said body member; a second pair of brace structures, in the form of an arm on each side of said body member; and a block providing a movable connection upwardly and downwardly with respect to said body member; each pair of parallel arms of the first mentioned pair of brace structures being pivotally connected by one set of ends with respect to the body member and being pivotally connected by the other set of ends with respect to the axle for a ground engaging wheel; each arm of the second mentioned pair of brace structures being movably connected with respect to the body member at one end and with respect to said pair of parallel arms by its other end; at least one arm of the arms on each side of the body member having a pivotal connection with said body member by means of said block; at least one arm of the arms on each side of the body member having pivotal connection with respect to a fixed point on said body member spaced from said block; said block being movable toward said fixed point on said body member to move said arms and said wheels toward said body member to a collapsed position and being movable away from said fixed point on said body member to move said arms and said wheels outwardly of said body member to an expanded position; said arms guiding said wheels for movement in an arc, the lowest point of which is defined in the collapsed position of the cart.

10. A wheeled cart as set forth in claim 7, wherein said load support extends rearwardly from said body member and wherein the axles for said wheels are positioned forwardly of said body member in both the collapsed and expanded positions of the cart, the lower end of said body member and said wheels in both positions of the cart defining a three point contact upon which the cart may be rested in an upright position in both the collapsed and expanded positions of the cart.

11. A wheeled cart as set forth in claim 7, wherein said pairs of arms in the expanded position of the cart each define an angle of less than 90 degrees with respect to the portion of said body member between said blocks.

CARL MAYNARD RUTLEDGE.
FRITZ ALTER.

References Cited in the file of this patent
UNITED STATES PATENTS

| Number | Name | Date |
|---|---|---|
| 2,228,046 | Bird | Jan. 7, 1941 |
| 2,381,858 | Austin | Aug. 14, 1945 |
| 2,470,272 | Trimmer | May 17, 1949 |
| 2,518,803 | Marvin | Aug. 15, 1950 |
| 2,520,226 | Smith | Aug. 29, 1950 |
| 2,563,033 | Greig | Aug. 7, 1951 |